United States Patent
Aoki et al.

(10) Patent No.: US 10,822,566 B2
(45) Date of Patent: Nov. 3, 2020

(54) BIOMASS FUEL MANUFACTURING PLANT, MANUFACTURING PLANT SYSTEM, AND BIOMASS FUEL MANUFACTURING METHOD

(71) Applicant: MITSUBISHI HEAVY INDUSTRIES, LTD., Tokyo (JP)

(72) Inventors: Yasumichi Aoki, Tokyo (JP); Akira Noma, Tokyo (JP); Yoshio Seiki, Tokyo (JP); Atsuhiro Yukumoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 117 days.

(21) Appl. No.: 16/194,855

(22) Filed: Nov. 19, 2018

(65) Prior Publication Data
US 2019/0153346 A1 May 23, 2019

(30) Foreign Application Priority Data
Nov. 22, 2017 (JP) .................. 2017-225172

(51) Int. Cl.
| | |
|---|---|
| *C10L 5/44* | (2006.01) |
| *C10B 53/02* | (2006.01) |
| *C10L 9/08* | (2006.01) |
| *C10L 5/14* | (2006.01) |
| *C10L 5/36* | (2006.01) |
| *B30B 9/06* | (2006.01) |

(52) U.S. Cl.
CPC .............. *C10L 5/447* (2013.01); *C10B 53/02* (2013.01); *C10L 5/14* (2013.01); *C10L 5/361* (2013.01); *C10L 5/363* (2013.01); *C10L 5/445* (2013.01); *C10L 9/08* (2013.01); *B30B 9/06* (2013.01); *C10L 2200/0484* (2013.01); *C10L 2290/02* (2013.01); *C10L 2290/08* (2013.01); *C10L 2290/28* (2013.01); *C10L 2290/30* (2013.01); *C10L 2290/32* (2013.01); *C10L 2290/46* (2013.01); *C10L 2290/545* (2013.01)

(58) Field of Classification Search
CPC combination set(s) only.
See application file for complete search history.

(56) References Cited

FOREIGN PATENT DOCUMENTS

| | | |
|---|---|---|
| EP | 1 990 399 | 11/2008 |
| JP | 2006-124515 | 5/2006 |

(Continued)

*Primary Examiner* — Ellen M McAvoy
*Assistant Examiner* — Chantel L Graham
(74) *Attorney, Agent, or Firm* — Wenderoth, Lind & Ponack, L.L.P

(57) ABSTRACT

A biomass fuel manufacturing plant includes: a separating section that separates oil and water from oil-containing wastewater discharged from an essential oil plant that refines essential oil from fruits containing fats and oils, and separates the oil and water into POME oil and treated water; a discharged oil supply line that supplies at least one of the POME oil, discharged oil at compressing discharged when compressing empty fruit bunches, and discharged oil at crushing discharged when crushing the empty fruit bunches, to at least one or more locations of a carbonization section that generates carbide by performing heat treatment with respect to the empty fruit bunches discharged from the essential oil plant and a fuel generation section that generates a fuel from the carbide.

26 Claims, 6 Drawing Sheets

(56) References Cited

FOREIGN PATENT DOCUMENTS

| JP | 2008-285547 | | | 11/2008 |
|---|---|---|---|---|
| JP | 2008285547 | A | * | 11/2008 |
| JP | 4849650 | | | 1/2012 |
| JP | 2012-122026 | | | 6/2012 |
| JP | 2012-153790 | | | 8/2012 |
| JP | 2012-228683 | | | 11/2012 |
| JP | 2012228683 | A | * | 11/2012 |

* cited by examiner

BIOMASS FUEL MANUFACTURING PLANT, MANUFACTURING PLANT SYSTEM, AND BIOMASS FUEL MANUFACTURING METHOD

BACKGROUND OF THE INVENTION

Field of the Invention

The present invention relates to a biomass fuel manufacturing plant, a manufacturing plant system, and a biomass fuel manufacturing method. Priority is claimed on Japanese Patent Application No. 2017-225172, filed Nov. 22, 2017, the content of which is incorporated herein by reference.

Description of Related Art

As a new fuel resource to replace a fossil fuel, practical application of a fuel derived from biomass has been advanced in recent years. As a specific example of the biomass, empty fruit bunches (EFB) of a palm tree generated in a refining process of palm oil can be employed. When refining the palm oil, a discharge amount of the empty fruit bunches also increases in proportion to a refining amount of the oil. Tens of millions of tons of empty fruit bunches generated during the recovery of the palm oil are generated each year, are discarded, and cause soil contamination. Therefore, there is a need for a technology (manufacturing of the biomass fuel) for reusing a large amount of empty fruit bunches which has been discarded in the past as a resource.

Here, Japanese Patent No. 4849650 is known as an example of a technology for manufacturing the biomass fuel using the empty fruit bunches to be discarded as a raw material. In the technology described in Japanese Patent No. 4849650, as a carbonized heat source fuel, tar or rare gas taken out by fractionation of a carbonized exhaust gas is reused, and accordingly, efficiency in the manufacturing of the biomass fuel is improved.

In addition, it is also known that the biomass fuel derived from fertilizers which are generally incorporated during plant growth contain impurities, such as potassium, sodium, chlorine and the like. In a case where a large amount of such impurities is contained, it is not possible to increase a mixed fuel burning ratio with coal because adhesion of ash to a furnace or a heat transfer surface of a coal fired power boiler or corrosion of a heat transfer surface is caused. In addition, in a case where the mixed fuel burning ratio of the biomass fuel and lime is low, there is also a possibility that it is not possible to obtain a desired calorific value.

Here, Japanese Patent No. 4849650 is known as an example of a technology for manufacturing the biomass fuel from which potassium, sodium and the like are removed. In the technology described in Japanese Patent No. 4849650, a method of fractionating palm waste into carbide, tar, and a gas containing an organic acid solution (wood vinegar aqueous solution), and washing potassium or sodium of a carbide surface by the organic acid solution obtained by cooling the gas is described.

SUMMARY OF THE INVENTION

However, according to the method of Japanese Patent No. 4849650, oil-containing wastewater (palm oil mill effluent (POME)) discharged from an essential oil plant has not been reused and the efficiency in the entire process of manufacturing the biomass fuel has room for improvement.

Further, according to the method of Japanese Patent No. 4849650, when obtaining the organic acid solution (wood vinegar aqueous solution) used for removing impurities, such as potassium and sodium, a high temperature gas generated in a carbonization step has to be cooled by an exhaust gas cooling device, and thus, there is a problem that the energy efficiency in the process of manufacturing the biomass fuel deteriorates.

The present disclosure has been made to solve the above-described problems, and an object thereof is to provide a biomass fuel manufacturing plant, a manufacturing plant system, and a biomass fuel manufacturing method that can reuse oil-containing wastewater and improve efficiency in the entire process of manufacturing the biomass fuel.

According to at least one aspect of the disclosure, there is provided a biomass fuel manufacturing plant including: a separating section that is configured to separate oil and water from oil-containing wastewater discharged from an essential oil plant that is configured to refine essential oil from fruits containing fats and oils, and separates the oil and water into POME oil and treated water; a discharged oil supply line that is configured to supply at least one of the POME oil, discharged oil at compressing discharged when compressing empty fruit bunches, and discharged oil at crushing discharged when crushing the empty fruit bunches, to at least one or more locations of a carbonization section that is configured to generate carbide by performing heat treatment with respect to the empty fruit bunches discharged from the essential oil plant and a fuel generation section that is configured to generate a fuel from the carbide, in which the discharged oil supply line is configured to supply at least one of the POME oil, the discharged oil at compressing, and the discharged oil at crushing to at least one location of the carbonization section and the fuel generation section.

According to the configuration, by using the oil (palm oil mill effluent (POME) oil) contained in the wastewater discharged at the time of palm oil manufacturing in at least one location of the carbonization section and the fuel generation section, the POME oil obtained from the oil-containing wastewater discharged from the essential oil plant can be used, for example, as a heat source of the carbonization section or as a carbide adhesive binder when generating a fuel. Accordingly, the POME oil can be obtained by reusing the oil-containing wastewater which was conventionally discarded. As a result, it is possible to reuse the oil-containing wastewater (POME) which was conventionally discarded, and it is possible to improve the efficiency of the entire process of manufacturing the biomass fuel and improve the environment.

In addition, in the separating section, a method of promoting separation of oil dispersed in the POME may be adopted using bubbles or the like.

Furthermore, according to the configuration, the discharged oil at compressing discharged by compressing the EFB is supplied to at least one or more locations of the carbonization section and the fuel generation section, and for example, can be used as the heat source of the carbonization section or can be used as the carbide adhesive binder when generating the fuel. Accordingly, in the carbonization section, it becomes possible to increase a supply amount of the heat source in a case where the supply amount of the heat source to the carbonization section is insufficient only with the POME oil. In addition, in the fuel generation section, it is not necessary to add a conventionally used adhesive component, such as starch, and further, not only an adhesive function but also an effect of filling carbide voids and coating the carbide surface are provided, and thus, it is possible to reduce the risk of spontaneous ignition or the like of a solid fuel to be manufactured.

Furthermore, since an amount of heat generation of the discharged oil (that is, discharged oil at compressing or POME oil) itself is added, an effect, such as an increase in the amount of heat generation of the solid fuel can be obtained.

Furthermore, according to the configuration, the discharged oil at crushing discharged by crushing the EFB is supplied to at least one or more locations of the carbonization section and the fuel generation section, and for example, can be used as the heat source of the carbonization section or can be used as the carbide adhesive binder when generating the fuel. The same effect as the effect of the discharged oil at compressing can be obtained.

Furthermore, according to another aspect of the disclosure, there is provided a biomass fuel manufacturing plant including: a carbonization section that is configured to generate a carbide by performing heat treatment with respect to empty fruit bunches discharged from an essential oil plant that is configured to refine essential oil from fruits containing fats and oils; a water washing section that is configured to remove impurities contained in carbide by washing the carbide with water; and a fuel generation section that is configured to generate a fuel from the carbide washed with the water by the water washing section.

According to this configuration, the carbide generated by the carbonization section is washed with water by the water washing section, and impurities are removed. Accordingly, a high quality biomass fuel can be obtained. Since the impurities are removed from the carbide, it is possible to improve the mixed fuel burning ratio with coal.

In addition, since the carbide obtained by the heat treatment is hydrophobic, it is possible to easily remove the water that comes into contact with the carbide by the washing with water in a subsequent step. Otherwise, in a case where carbonizing treatment (hydrothermal carbonization or the like) is applied to the carbonization section such that constrained water in the biomass fuel is changed into free water, the impurities are dissolved in the free water, and thus, it is possible to easily remove the water content containing the impurities by ventilation drying and the like. Furthermore, there is a case where the carbide immediately after the carbonization has fire, but in the above-described configuration, direct cooling with water is performed, and thus, it is possible to extinguish the fire. In addition, since the minute voids on the inside of the carbide are filled with water, contact with oxygen is suppressed, and spontaneous ignition of the carbide can be suppressed.

Furthermore, according to still another aspect of the disclosure, there is provided a biomass fuel manufacturing method including: a separating step of separating oil and water from oil-containing wastewater discharged from an essential oil plant that is configured to refine essential oil from fruits containing fats and oils, and separating the oil and water into POME oil and treated water; and a discharged oil supplying step of supplying at least one of the POME oil, discharged oil at compressing discharged when compressing empty fruit bunches, and discharged oil at crushing discharged when crushing the empty fruit bunches, to at least one or more locations in a carbonization step of generating carbide by performing heat treatment with respect to the empty fruit bunches discharged from the essential oil plant and a fuel generation step of generating a fuel from the carbide, in which, in the discharged oil supplying step, at least one of the POME oil, the discharged oil at compressing, and the discharged oil at crushing to at least one of the carbonization step and the fuel generation step is supplied to at least one location in the carbonization step and the fuel generation step.

According to this method, in the separating step, the oil and water are separated from the oil-containing wastewater (POME) discharged from the essential oil plant and separated into the POME oil and the treated water. In the separating section, a method of promoting separation of oil dispersed in the POME may be adopted using the bubbles or the like. In the discharged oil supplying step, the POME oil is supplied to the carbonization step and the fuel generation step. According to this method, the POME oil is supplied to the carbonization step or the fuel generation step by the discharged oil supplying step, and thus, it is possible to utilize the POME oil as a heat source at the time of the heat treatment, or as a carbide adhesive binder when generating a fuel. Accordingly, the amount of waste can be reduced, and the operation cost of the carbonization section can be reduced.

Furthermore, according to the method, the discharged oil at compressing discharged by compressing the EFB can be supplied to at least one or more locations in the carbonization step and the fuel generation step, and for example, can be used as the heat source at the time of the heat treatment in the carbonization step or can be used as the carbide adhesive binder when generating the fuel. Accordingly, in a case where the supply amount of the heat source to the carbonization step is insufficient only with the POME oil, it becomes possible to increase the supply amount of the heat source. In addition, in the fuel generation step, it is not necessary to add a conventionally used adhesive component, such as starch, and furthermore, and not only an adhesive function but also an effect of filling carbide voids and coating the carbide surface are provided, and thus, it is possible to reduce the risk of spontaneous ignition or the like of a solid fuel to be manufactured. Furthermore, since the amount of heat generation by the discharged oil itself is added, an effect, such as an increase in the amount of heat generation of the solid fuel, can be obtained.

Furthermore, according to the method, the discharged oil at crushing discharged by crushing the EFB can be supplied to at least one or more locations in the carbonization step and the fuel generation step, and for example, can be used as the heat source at the time of the heat treatment in the carbonization step or can be used as the carbide adhesive binder when generating the fuel. The same effect as the effect of the discharged oil at compressing can be obtained.

Furthermore, according to still another aspect of the disclosure, there is provided a biomass fuel manufacturing method including: a carbonization step of generating a carbide by performing heat treatment with respect to empty fruit bunches discharged from an essential oil plant by using oil-containing wastewater discharged from the essential oil plant that is configured to refine essential oil from fruits containing fats and oils as a fuel; a water washing step of removing impurities contained in the carbide by washing the carbide with water; and a fuel generation step of generating the fuel from the carbide washed with the water in the water washing step.

According to this method, the carbide generated in the carbonization step is washed with water in the water washing step, and the impurities, such as potassium, sodium, chlorine, are removed. Accordingly, it is possible to obtain the biomass fuel capable of high co-combustion with coal in a coal-fired power boiler. Meanwhile, in a case where the impurities are contained in the carbide, it is not possible to increase a mixed fuel burning ratio with coal because adhesion of ash to a furnace or a heat transfer surface of a coal fired power boiler or corrosion of a heat transfer surface is caused. However, according to the above-described method, since the impurities are removed from the carbide, it is possible to reduce such a possibility. In addition, since the carbide is hydrophobic, it is possible to easily remove the water that comes into contact with the carbide by washing with water in a subsequent step. Furthermore, there is a case where the carbide immediately after the carbonization has fire, but in the above-described method, direct cooling with water is performed, and thus, it is possible to extinguish the fire. In addition, since the minute voids on the inside of the carbide are filled with water, contact with oxygen is suppressed, and spontaneous ignition of carbide can be suppressed.

According to the biomass fuel manufacturing plant and the biomass fuel manufacturing method, it is possible to improve energy efficiency, and to manufacture the biomass fuel having a high calorific value.

DETAILED DESCRIPTION OF THE INVENTION

Figure 1:
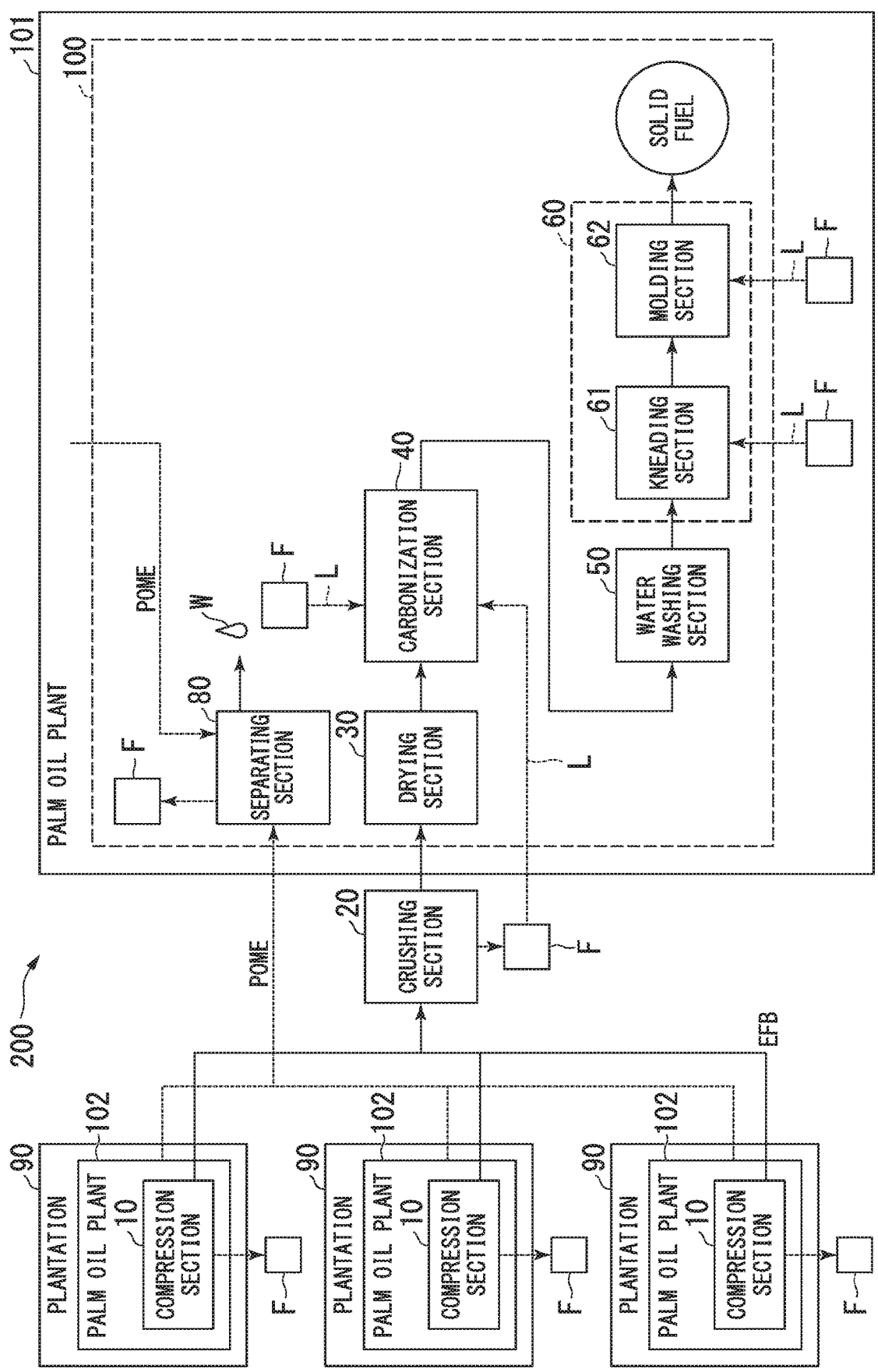
FIG. 1 is a schematic view showing a configuration of a biomass fuel manufacturing plant system according to a first embodiment.

A first embodiment will be described with reference to FIGS. 1 to 6. A biomass fuel manufacturing plant system 200 according to the embodiment includes a plurality of plantations 90 and a biomass fuel manufacturing plant 100. Each plantation 90 is an essential oil plant having a palm oil plant 102 for refining essential oil (palm oil). In addition, the biomass fuel manufacturing plant 100 may be provided on the inside of the palm oil plant 101.

The biomass fuel manufacturing plant 100 manufactures a solid fuel (biomass fuel) using residual materials generated in the palm oil plants 101 and 102. The manufacturing plant 100 includes a separating section 80 and a discharged oil supply line L. The separating section 80 separates oil and water from oil-containing wastewater (palm oil mill effluent (POME)) discharged from the palm oil plants 101 and 102, and separates the oil and water into the POME oil and treated water.

The POME oil separated by the separating section 80 is recovered in a discharged oil supply section F through the discharged oil supply line L. In addition, the separating section 80 and the discharged oil supply line L may be incorporated on the inside of the manufacturing plant 100 or may be individually provided on the outside of the manufacturing plant 100. In addition, in the discharged oil supply section F, a tank in which the POME oil, discharged oil at compressing and discharged oil at crushing which will be described later, are mixed and recovered, may be separately provided. The POME oil recovered in the tank, the discharged oil at compressing, and the discharged oil at crushing are supplied to one or more locations of the carbonization section or the fuel generation section (kneading section or molding section) which will be described later.

The palm oil plants 101 and 102 are a facility for refining the palm oil using fruits of palm containing fats and oils as a raw material. In the palm oil plants 101 and 102, as residues resulting from refinement of the palm oil, the wastewater (oil-containing wastewater: POME) containing an oil content and empty fruit bunches (EFB) are discharged.

As shown in FIG. 1, in the embodiment, the plurality of plantations 90 are dispersedly disposed in various places. In addition, one plantation 90 may configure a small-scale biomass fuel manufacturing plant system. The palm oil plant 102 of each plantation 90 includes a compression section 10 for compression by applying a pressure to the EFB. In the compression section 10, the discharged oil (discharged oil at compressing) effused as the EFB is compressed, is generated. The discharged oil at compressing is supplied to a carbonization section 40 or a fuel generation section 60 of a manufacturing plant 100 to be described later, and is utilized as a fuel or a binder. Specifically, as the compression section 10, a compactor 10A shown in FIG. 3 is used.

In addition, the compression section 10 may be provided in the palm oil plant 102 in each plantation 90 or may be provided in a different place from each plantation 90. Furthermore, the compression section 10 may be provided on a track.

Figure 3:
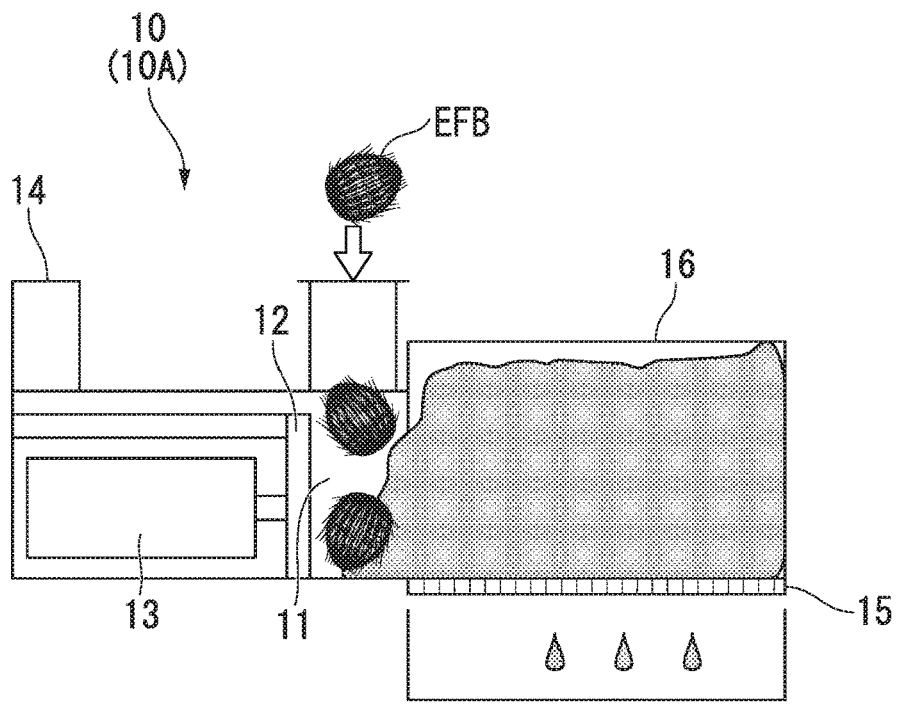
FIG. 3 is a view showing a configuration of a compression section according to the first embodiment.

As shown in FIG. 3, the compactor 10A includes a compression chamber 11 to which the EFB is input, a piston 12 which compresses the EFB by moving from one side to the other side in the compression chamber 11, a hydraulic cylinder 13 which drives the piston 12, and a hydraulic unit 14 that supplies a hydraulic pressure to the hydraulic cylinder 13. The compressed EFB is recovered from the compression chamber 11 in a container 16 disposed to be adjacent to the compactor 10A. In a lower portion of the container 16, a mesh 15 is provided for recovering the discharged oil at compressing. In other words, the discharged oil at compressing effused as the EFB is compressed flows downward through the mesh 15 and is recovered in the discharged oil supply section F. After being separated from the compactor 10A, the container 16 is transported by a vehicle or the like and sent to a crushing section 20 to be described later.

The EFB compressed by the compression section 10 is recovered in a recovery step S2 and sent to the crushing section 20. The crushing section 20 may be provided separately from the plantation 90 or the biomass fuel manufacturing plant 100. In the crushing section 20, the EFB compressed by the compression section 10 is finely crushed (crushing step S3). As a specific aspect of the crushing section 20, a device, such as a wood chipper for pulverizing wood or the like into a chip shape, a shearing crusher having a rotation shaft, a swing hammer type crusher for impact-shearing crushing by a hammer, and the like are appropriately used. Along with the crushing, the oil content (discharged oil at crushing) effused from the EFB. The discharged oil at crushing is recovered by the discharged oil supply section F and utilized as a fuel or a binder in the carbonization section 40 or the fuel generation section 60 to be described later (discharged oil supplying step S9). In addition, the crushing section 20 may be provided in the plantation 90.

Figure 2:
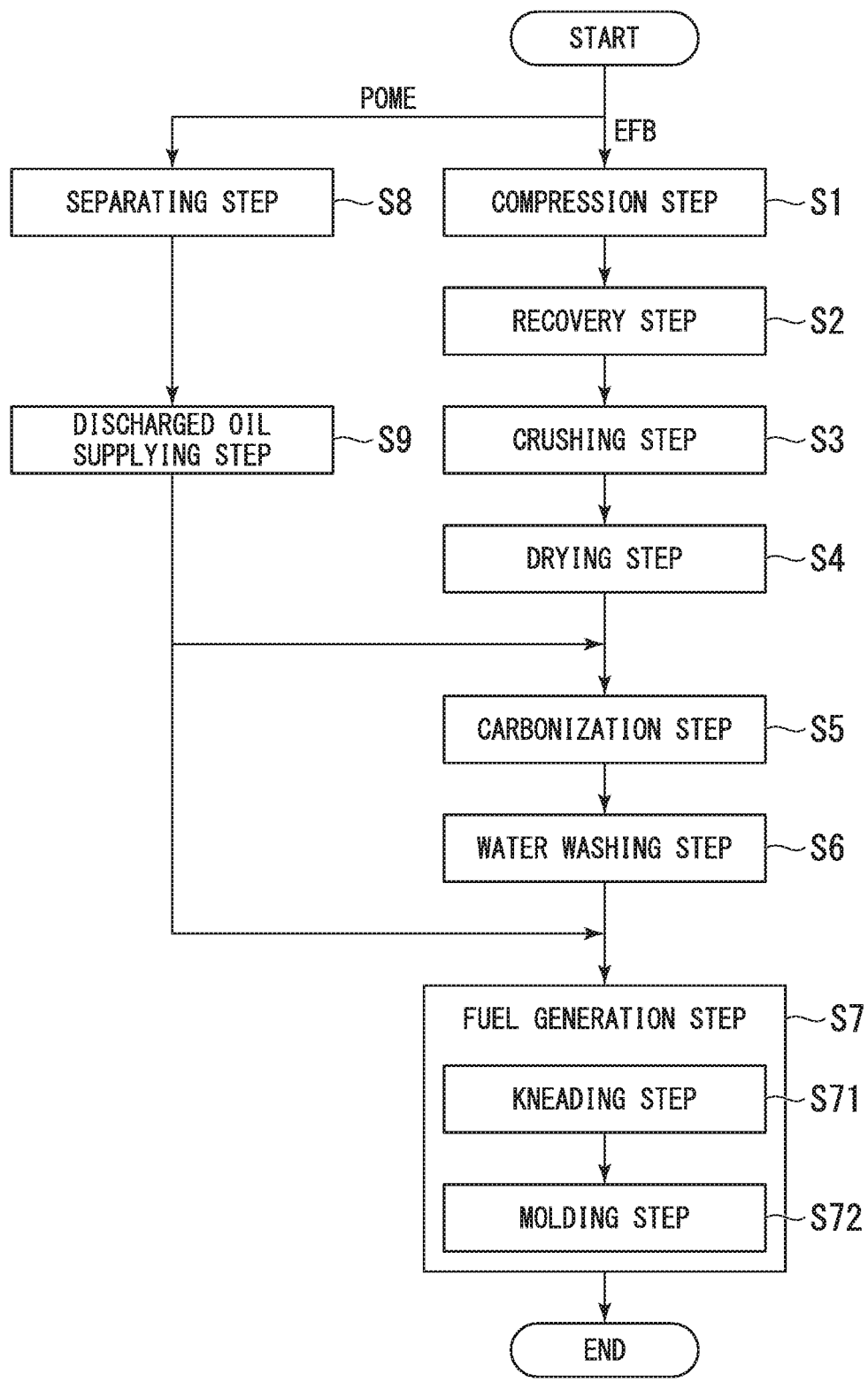
FIG. 2 is a flowchart showing a process of a biomass fuel manufacturing method according to the first embodiment.

Next, the configuration of the biomass fuel manufacturing plant 100 and the biomass fuel manufacturing method will be described with reference to FIGS. 1 and 2. As shown in FIG. 1, the manufacturing plant 100 includes the separating section 80, the drying section 30, the carbonization section 40, a water washing section 50, and the fuel generation section 60. As shown in FIG. 2, the biomass fuel manufacturing method includes a compression step S1 by the above-described compression section 10, a recovery step S2 of recovering the compressed EFB, a crushing step S3 by the above-described crushing section 20, a drying step S4, a carbonization step S5, a water washing step S6, and a fuel generation step S7. Through the process shown in FIG. 2, the biomass fuel is manufactured from the EFB.

In addition, as described above, the POME discharged from the palm oil plant 102 in the plantation 90 is separated into oil and water in the separating step S8 by the separating section 80 and separated into the POME oil and the treated water. The separated POME oil is supplied to the carbonization step S5 or the fuel generation step S7 in the discharged oil supplying step S9.

Figure 4:
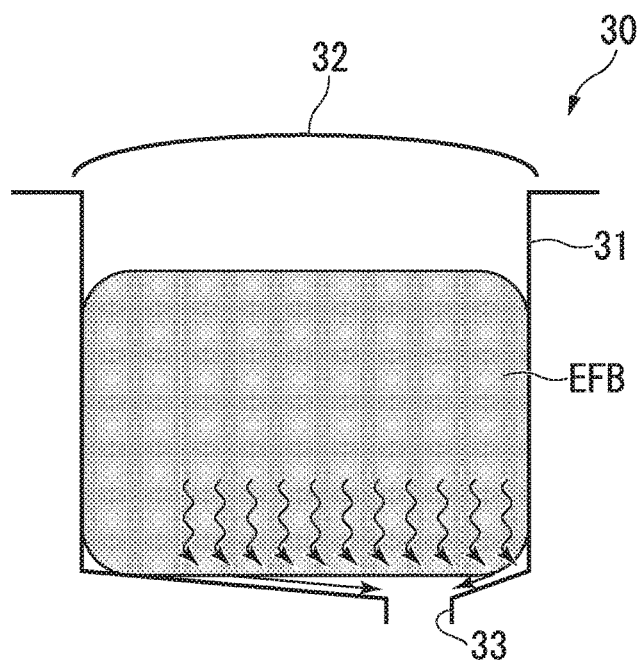
FIG. 4 is a view showing a configuration of a drying section according to the first embodiment.

In the drying section 30, the water content is removed from the crushed EFB by the crushing section 20 (drying step S4). In addition to the method of drying by coming into contact with gas generated in a hot air furnace, as shown in FIG. 4, the drying section 30 may have a structure, such as the drying section 30 including a container-like storage section 31 which stores the crushed EFB therein and a cover section 32 which covers the upper portion of the storage section 31. According to the example, the storage section 31 has a silo shape having sufficient dimensions in an up-down direction, and the crushed EFB is input into the storage section 31. In the lower portion of the storage section 31, a discharge port 33 for discharging the water content effused from the crushed EFB is formed. Further, as shown in FIG. 4, a bottom surface of the storage section 31 may be inclined and the water content may be collected in the discharge port 33. The cover section 32 is in a shape of a sheet which can be formed of a transparent (sunlight-transmitting) material, such as vinyl chloride or polyethylene. In other words, the cover section 32 can allow the sunlight or the external light and heat to reach the storage section 31.

The dried EFB is then sent to the carbonization section 40. In the carbonization section 40, the heat treatment is performed with respect to the dried EFB and the EFB is carbonized. Specifically, by the rotary kiln furnace or the like, the carbonized EFB (carbide) is generated by applying the heat from the outside of the rotary kiln furnace and by steaming the EFB (carbonization step S5). In addition, in the heat treatment in the carbonization section 40, one or more types of oil (fuel oil) of the POME oil, the discharged oil at compressing, and the discharged oil at crushing recovered by the discharged oil supply section F are supplied to a combustion furnace placed separately from the rotary kiln, and the high-temperature exhaust gas after the combustion is used as a heat source. The fuel oil is recovered in the discharged oil supply section F and is supplied to the carbonization section 40 and the like through the discharged oil supply line L (discharged oil supplying step S9). The discharged oil supply section F is, for example, a tank, a pump, or the like.

In addition to the above-described method, the carbonization section 40 may be a hydrothermal carbonization method in which steam is supplied to a reactor and the carbonization is performed.

Figure 5:
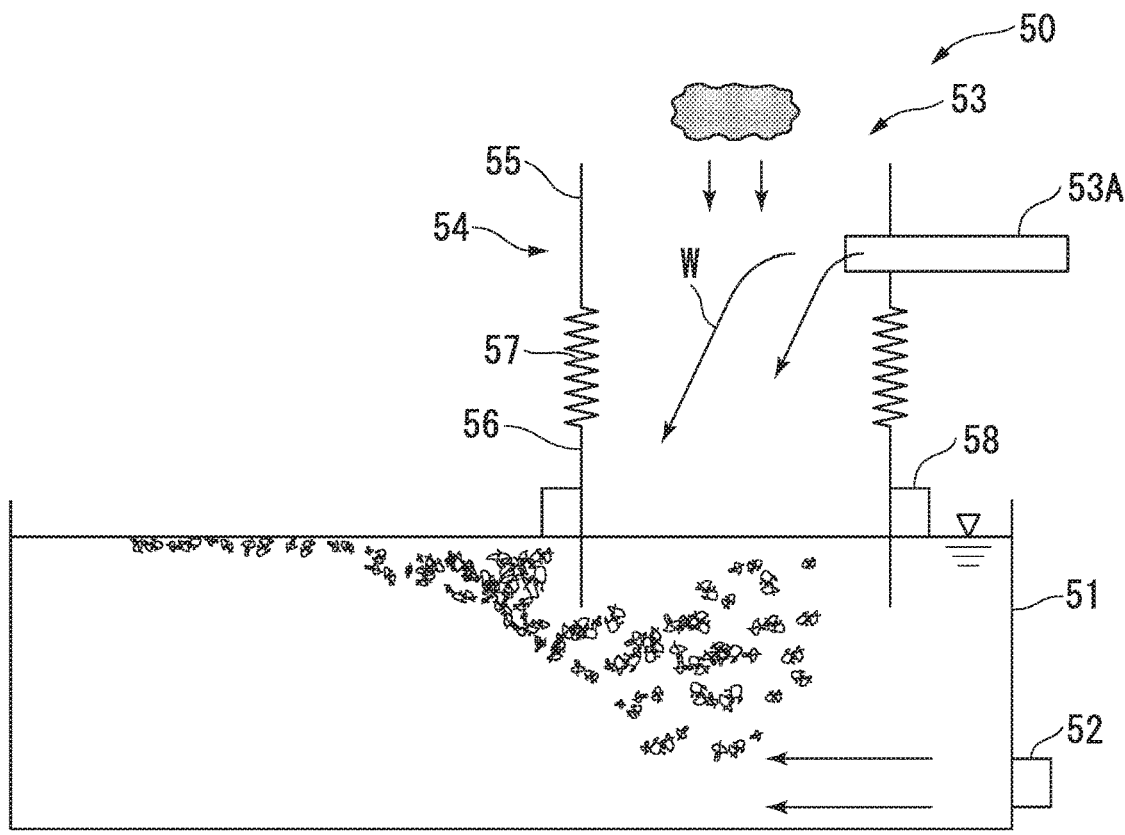
FIG. 5 is a view showing a configuration of a water washing section according to the first embodiment.

The carbide to which the heat treatment is performed by the carbonization section 40 is then sent to the water washing section 50. In the water washing section 50, the impurities are removed from the carbide by washing the carbide with water (water washing step S6). In addition, the impurities referred to here include potassium, sodium, and chlorine contained in the carbide. As shown in FIG. 5, the water washing section 50 according to the embodiment includes a pool 51, a water flow generation section 52, and an input section 53.

Water is stored in the pool 51. The water flow generation section 52 causes the water in the pool 51 to flow from one side to the other side in a substantially horizontal direction. In order to make kneading easy by performing the kneading by a kneading section 61 to be described later at a higher temperature, the water temperature may be approximately 45 to 70 degrees. The input section 53 is provided above the water surface of the pool 51. Through the input section 53, the carbide is input into the pool 51 together with water W. The input section 53 includes a water injection section 53A and an input cylinder 54. The water injection section 53A has a tubular shape extending from a side wall of the input cylinder 54 into the input cylinder 54, and supplies the water supplied from the outside into the input cylinder 54. The input cylinder 54 has a tubular shape extending from the input section 53 to the lower part of the water surface. In other words, an end portion on a lower side of the input cylinder 54 is submerged below the water surface. Furthermore, the input cylinder 54 has an input cylinder main body 55 positioned relatively above, a discharge cylinder 56 positioned below the input cylinder main body 55, and a connection section 57 which connects the input cylinder main body 55 and the discharge cylinder 56 to each other in the up-down direction. In the end portion below the discharge cylinder 56, a float portion 58 (formed of a material having a smaller specific gravity than water) capable of floating on the water surface is provided. More specifically, the float portion 58 is mounted slightly above the end portion below the discharge cylinder 56. The connection section 57 is formed of an elastically deformable material. Accordingly, the connection section 57 can be deformed following the change in the height position of the discharge cylinder 56 on the water surface. In other words, even when the height of the water surface changes, the height position of the discharge cylinder 56 normally holds a constant position following the height of the water surface.

The carbide input into the pool 51 through the input section 53 is washed with water while being transported from one side to the other side by the water flow generated by the water flow generation section 52. In addition, since the carbide has a smaller specific gravity than water, in the water, the carbide tends to float from the water bottom side to the water surface side. The carbide which floats and is washed with water is recovered on the water surface and sent to the following fuel generation section 60 (fuel generation step S7).

The fuel generation section 60 includes the kneading section 61 and a molding section 62.

In the kneading section 61, one or more of the POME oil, the discharged oil at compressing, and the discharged oil at crushing is supplied as a binder to the carbide which has been washed with water (discharged oil supplying step S9), and the binder is mixed with the carbide (kneading step S71). Since all of the three types of the oil have calorific values equal to or higher than that of C heavy oil (Heavy Fuel Oil), it is possible to improve the calorific value of the obtained biomass fuel. In addition, in addition to the above-mentioned POME oil, the discharged oil at compressing, and the discharged oil at crushing, it is also possible to use starch, polyvinyl alcohol or the like. By being mixed with the binder, the carbides that are mutually free in an initial state adhere to each other and become a muddy mixture. In addition, the inside of the voids of the carbide is filled with the binder, the surface of the carbide is coated, and thus, it is possible to reduce the possibility that the carbide comes into contact with the oxygen and ignites spontaneously.

In the molding section 62, the mixture of carbide and the binder is molded into a predetermined shape (for example, pellet shape) (molding step S72). In addition, in the molding section 62, similarly to the above-described kneading section 61, one or more types of the POME oil, the discharged oil at compressing, and the discharged oil at crushing recovered in the discharged oil supply section F may be supplied as the binder (FIG. 1).

Figure 6:
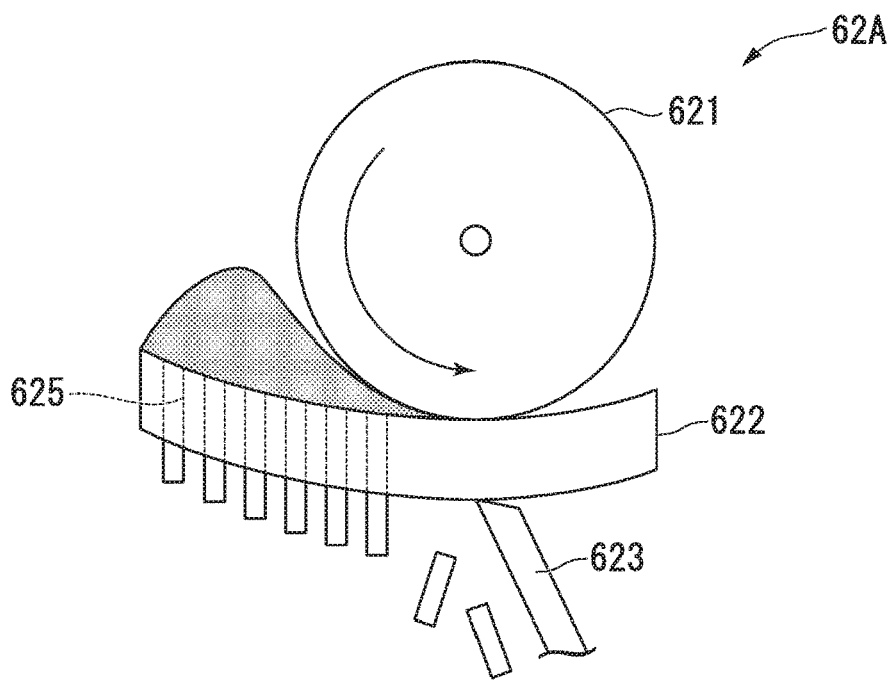
FIG. 6 is a view showing a configuration of a molding section according to the first embodiment.

As a device used in the molding section 62, a pelletizer 62A shown in FIG. 6 is employed as an example. The pelletizer 62A includes a compression roller 621, a die (porous plate) 622, and a cutter 623. The compression roller 621 has a shape of a disk around a shaft extending in the substantially horizontal direction, and a plurality of teeth arranged at intervals in a circumferential direction are provided on one side surface. The compression roller 621 rotates around the shaft. The die 622 is disposed with a gap below the compression roller 621. The die 622 has a shape of a plate extending in the substantially horizontal direction, and a plurality of holes 625 that penetrate in the up-down direction are formed. The mixture is supplied to the gap between the compression roller 621 and the die 622. The mixture pressed against the die 622 by the compression roller 621 has a shape of a rod that corresponds to the shape of the hole 625 as flowing downward through the hole 625 of the die 622. The cutter 623 is provided below the porous plate 622, and cuts the mixture extruded from the porous plate 622 to a predetermined length. Accordingly, pellet-like solid fuel (biomass fuel) is generated. In the molding section 62, in addition to the above-described flat die method, a ring die method may be used, or a briquette granulation method which is a compression molding method under pressure may be used.

As described above, according to the above-described configuration, one or more types of the POME oil, the discharged oil at compressing, and the discharged oil at crushing are mixed as a binder by the kneading section 61 or the molding section 62 of the fuel generation section 60. Since all of the three types of the oils have calorific values equal to or higher than that of C heavy oil, it is possible to improve the calorific value of the obtained biomass fuel. Here, the binder is, for example, oil of approximately 9000 kcal/kg. In addition, the inside of the voids of the carbide is filled with the binder, the surface of the carbide is coated, and thus, it is possible to reduce the possibility that the carbide comes into contact with the oxygen and ignites spontaneously. Further, by kneading by the kneading section 61, the biomass fuel can be easily molded.

Furthermore, according to the above-described configuration, after the EFB is compressed by the compression section 10, the EFB is crushed by the crushing section 20, and thus, it is possible to reduce the bulk of the entire EFB. Accordingly, it is possible to improve the transportation efficiency of the EFB. Furthermore, by drying by the drying section 30, it is possible to remove the water content from the crushed EFB and to reduce the calorific value required for the carbonization. In addition, the discharged oil at compressing and the discharged oil at crushing generated by the compression section 10 and the crushing section 20 are supplied to one or more locations of the carbonization section 40 or the fuel generation section 60 by the discharged oil supply section F, and can be utilized as an aid for safely handing the fuel for the heat treatment or the binder when generating the fuel and a solid fuel. Accordingly, it is possible to manufacture a solid fuel that can be safely handled with high efficiency.

Furthermore, in the carbonization section 40, it becomes possible to increase a supply amount of the heat source in a case where the supply amount of the heat source to the carbonization section is insufficient only with the POME oil. In the fuel generation section, it becomes possible to eliminate the need for addition of a conventionally used adhesive component, such as starch. Furthermore, not only an adhesive function but also an effect of filling carbide voids and coating the carbide surface are provided, and thus, it is possible to reduce the risk of spontaneous ignition or the like of the solid fuel to be manufactured. Furthermore, since the amount of heat generated by the discharged oil itself is added, an effect, such as an increase in the amount of heat generation of the solid fuel, can be obtained.

In addition, according to the above-described configuration, the carbide generated by the carbonization section 40 is washed with water by the water washing section 50, and the impurities are removed. Specifically, after decomposing cellulose or hemicellulose and a lignin component that configure the biomass by the heat treatment, by washing with water, a cell wall of the carbide is decomposed, and thus, it is possible to remove components into which the impurities (potassium, sodium, chlorine, and the like) are incorporated from the cell. Accordingly, a biomass fuel having a high calorific value can be obtained. Otherwise, in a case of the hydrothermal carbonization method using the steam, constrained water in the biomass fuel is changed into free water which is likely to be separated after the hydrothermal carbonization processing in the process of the hydrothermal carbonization, and thus, the impurities are dissolved in the free water and it is possible to easily remove the water content containing the impurities. Meanwhile, in a case where the carbide contains the impurities, when mixing with the coal, both are not mixed sufficiently due to the influence of the impurities and there is a possibility that the desired calorific value cannot be obtained. However, according to the above-described configuration, since the impurities are removed from the carbide, it is possible to reduce such a possibility. In addition, since the carbide has water repellency, it is possible to easily remove the adhering water by washing with water in a subsequent step. Furthermore, there is a case where the carbide immediately after the carbonization has fire, but in the above-described configuration, direct cooling with water is performed, and thus, it is possible to extinguish the fire. In addition, since the minute voids on the surface of the carbide are filled with water, contact with oxygen is suppressed, and spontaneous ignition of carbide can be suppressed.

In addition, according to the above-described water washing section 50, by inputting the carbide into the pool 51 (in water), it is possible to cool the carbide and remove the impurities, such as potassium, sodium, and chlorine, at the same time. Furthermore, according to the above-described configuration, since the carbide is input into the pool 51 together with the water by the input section 53 and the water in the pool 51 flows from one side to the other side by the water flow generation section 52, it is possible to stably wash the carbide with water and transport the carbide. In addition, since the water is injected by the water injection section 53A and dropped into the pool 51 together with the carbide, it is possible to reduce the possibility that the input cylinder 54 is blocked by the carbide. Additionally, since the discharge cylinder 56 has the float portion 58 and is connected to the input cylinder main body 55 by the deformable connection section 57, it is possible to change the height position of the discharge cylinder 56 in accordance with the change in the water surface height. Accordingly, it is possible to reduce the possibility that the end portion of the discharge cylinder 56 is exposed on the water surface, and to achieve a state where the carbide is normally exposed to the water.

In addition, according to the above-described drying section 30, it is possible to recover the heat by the sunlight in the storage section 31 through the cover section 32 formed of a material having light transmitting properties. Due to the heat, it is possible to further promote the drying of the EFB.

In addition, in the drying section 30, the empty fruit bunches stored in the storage section are squeezed by their own weight, and discharge the contained water content. In other words, it is possible to remove the water content from the empty fruit bunches and to dry the empty fruit bunches without using other devices or power. Accordingly, since the configuration of the drying section is simplified, it is possible to reduce the manufacturing cost or the maintenance cost.

In addition, according to the above-described configuration, the crushing processing is performed after recovering the EFB previously compressed by the compression section 10 of the palm oil plant 102 of each plantation 90 into one plant. By transporting the EFB in a compressed state, it is possible to reduce the transportation efficiency and the cost from the plantation 90 to the plant. In addition, since it is unnecessary to provide the devices by dispersing the devices, such as the crushing section 20, in each plantation 90, it is possible to uniformly manage the production amount or the like of the biomass fuel.

Above, the first embodiment is described with reference to the drawings. In addition, for example, in the above-described first embodiment, an example in which the pelletizer 62A shown in FIG. 6 is used as the molding section 62 has been described. However, the aspect of the molding section 62 is not limited to the above, and it is also possible to use a briquette granulation method which is a compression molding method by pressure.

In addition, FIG. 2 shows the separating step of the POME discharged from the palm oil plants 101 and 102. As shown in FIG. 2, the oil and the water of the POME is separated in the separating step S8 by the separating section 80 and separated into the POME oil and the treated water. Thereafter, in the discharged oil supplying step S9, the separated POME oil is supplied to carbonization step S5 or the fuel generation step S7, and can be utilized as a fuel for the heat treatment or a binder when molding the fuel. In such a manufacturing method, the water washing step S6 may be omitted and the fuel generation step S7 may be performed after the carbonization step S5.

Figure 7:
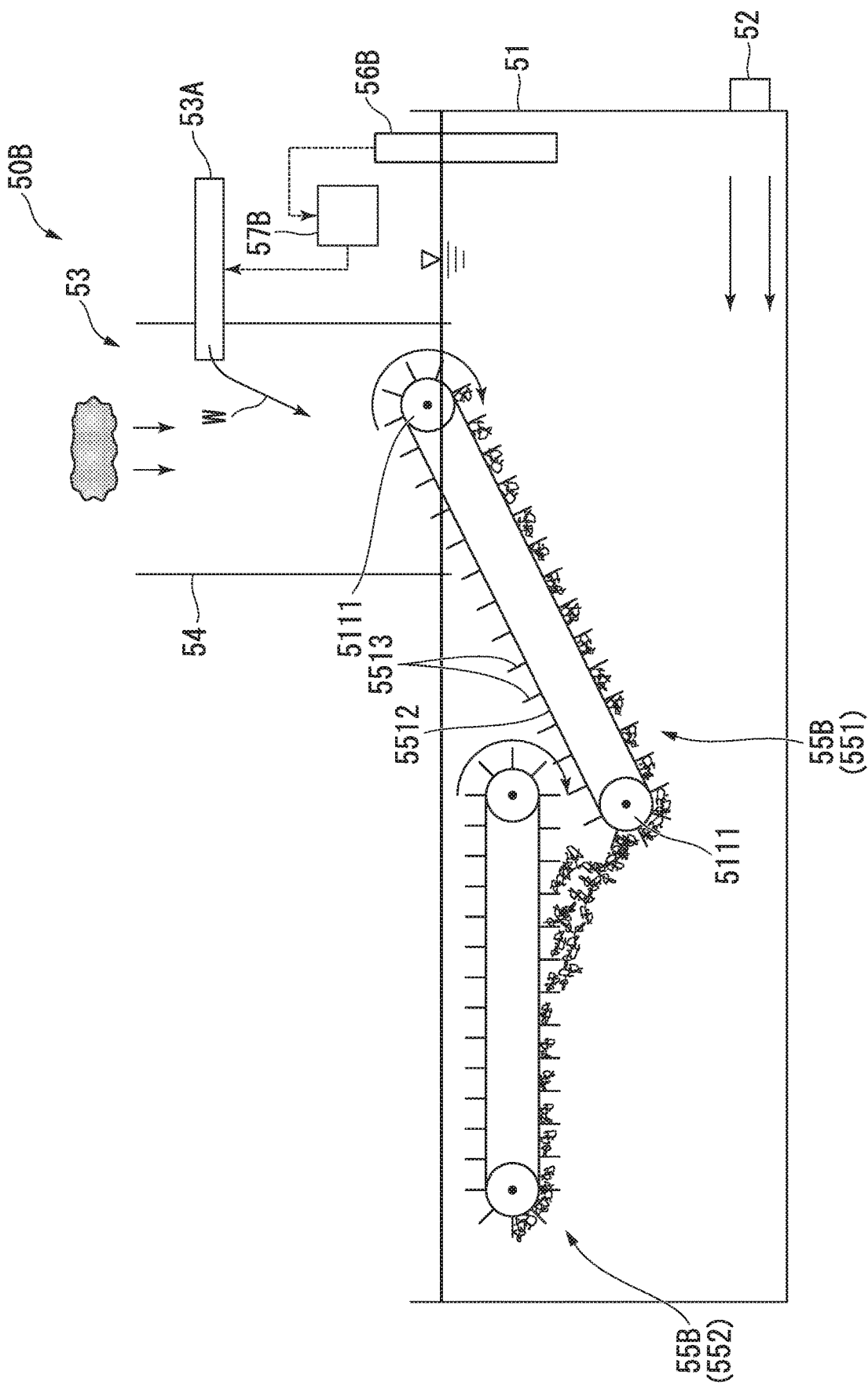
FIG. 7 is a view showing a configuration of a water washing section according to a second embodiment.

Next, a second embodiment will be described with reference to FIG. 7. In addition, the same reference numerals will be given to the same configurations as those in the above-described embodiment, and the detailed description thereof will be omitted. In the embodiment, the configuration of a water washing section 50B is different from that of the above-described first embodiment. As shown in FIG. 7, the water washing section 50B according to the embodiment includes the pool 51, a water amount control section 57B, the water flow generation section 52, the input section 53, a transport section 55B, and a water surface detection section 56B.

Water is stored in the pool 51. The water flow generation section 52 causes the water in the pool 51 to flow from one side to the other side in the substantially horizontal direction. The input section 53 is provided above the water surface of the pool 51. Through the input section 53, the carbide is input into the pool 51 together with water W. The input section 53 includes the water injection section 53A and the input cylinder 54. The water injection section 53A has a tubular shape or an angular shape extending from the side wall of the input cylinder 54 into the input cylinder 54, and supplies the water supplied from the outside into the input cylinder 54. The input cylinder 54 has a tubular shape extending from the input section 53 to the lower part of the water surface. In other words, the end portion on the lower side of the input cylinder 54 is submerged below the water surface. The water amount control section 57B is connected to the water injection section 53A, for example, and maintains the amount of water stored in the pool 51 constant by adjusting the supply amount of the water to the pool 51 by the water injection section 53A.

The transport section 55B is a conveyor disposed in the pool 51 and includes a pair of rollers 5511 disposed in parallel to each other, and a belt 5512 bridged between the rollers 5511. The pair of rollers 5511 rotates in the same direction around the own axes. The belt 5512 is provided with a plurality of plate portions 5513 extending in the substantially vertical direction from the surface of the belt 5512 and arranged at intervals in a direction in which the belt 5512 extends.

In the embodiment, the plurality (two) of transport sections 55B (a first transport section 551 and a second transport section 552) are arranged in the substantially horizontal direction. The first transport section 551 positioned on the input cylinder 54 side is disposed diagonally from the upper part to the lower part as being oriented from one side to the other side. In addition, in the belt 5512, the surface positioned on the upper side of the roller 5511 is oriented from the other side to one side and the surface positioned on the lower side of the roller 5511 rotates in the direction oriented from one side to the other side. The second transport section 552 positioned on the side separated from the input cylinder 54 extends in the substantially horizontal direction. The end portion on one side of the second transport section 552 is positioned above the end portion on the other side of the first transport section 551. In other words, at least a part of the first transport section 551 and a part of the second transport section 552 overlap each other in the up-down direction. In addition, a rotational direction of the belt 5512 of the second transport section 552 is the same as a rotational direction of the belt 5512 of the first transport section 551.

The water surface detection section 56B detects the height of the water surface of the pool 51 and sends out a detected value to the water amount control section 57B. Specifically, in the water amount control section 57B, the water amount control section 57B is controlled based on the detected value of the water surface detection section 56B such that the end portion on at least one side (input cylinder 54 side) in the transport section 55B is exposed above the water surface, and the supply amount of the water by the water injection section 53A is adjusted.

In the above-described water washing section 50B, the carbide is first input together with the water from the input section 53. The carbide falls together with the water in the input cylinder 54 and reaches the transport section 55B. As the belt 5512 of the transport section 55B rotates, the plate portion 5513 moves the carbide in the direction of sinking into the water. Furthermore, the carbide is washed with water while being transported from one side to the other side along the lower surface of the belt 5512. After the carbide that has reached the end portion on the other side of the first transport section 551 floats up due to the own buoyancy, the carbide reaches the second transport section 552 positioned above the first transport section 551, and is transported from one side to the other side.

According to the above-described configuration, by inputting the carbide into the pool 51 (in water), it is possible to cool the carbide and remove the impurities, such as potassium, sodium, and chlorine, at the same time. Furthermore, according to the above-described configuration, since the carbide is input into the pool 51 together with the water by the input section 53 and the water in the pool 51 flows from one side to the other side by the water flow generation section 52, it is possible to stably wash the carbide with water together with transport by the transport section 55B. In addition, since the water is injected by the water injection section 53A and input into the pool 51 via the transport section 55B together with the carbide, it is possible to reduce the possibility that the input cylinder 54 is blocked by the carbide. In addition, since the water amount control section 57B adjusts the supply amount of the water by the water injection section 53A such that the end portion on at least one side of the transport section 55B is exposed above the water surface based on the detected value of the water surface detection section 56B, it is possible to reduce the possibility that the entire transport section 55B is submerged. Accordingly, it is possible to smoothly wash the input carbide with water and transport the carbide.

Figure 8:
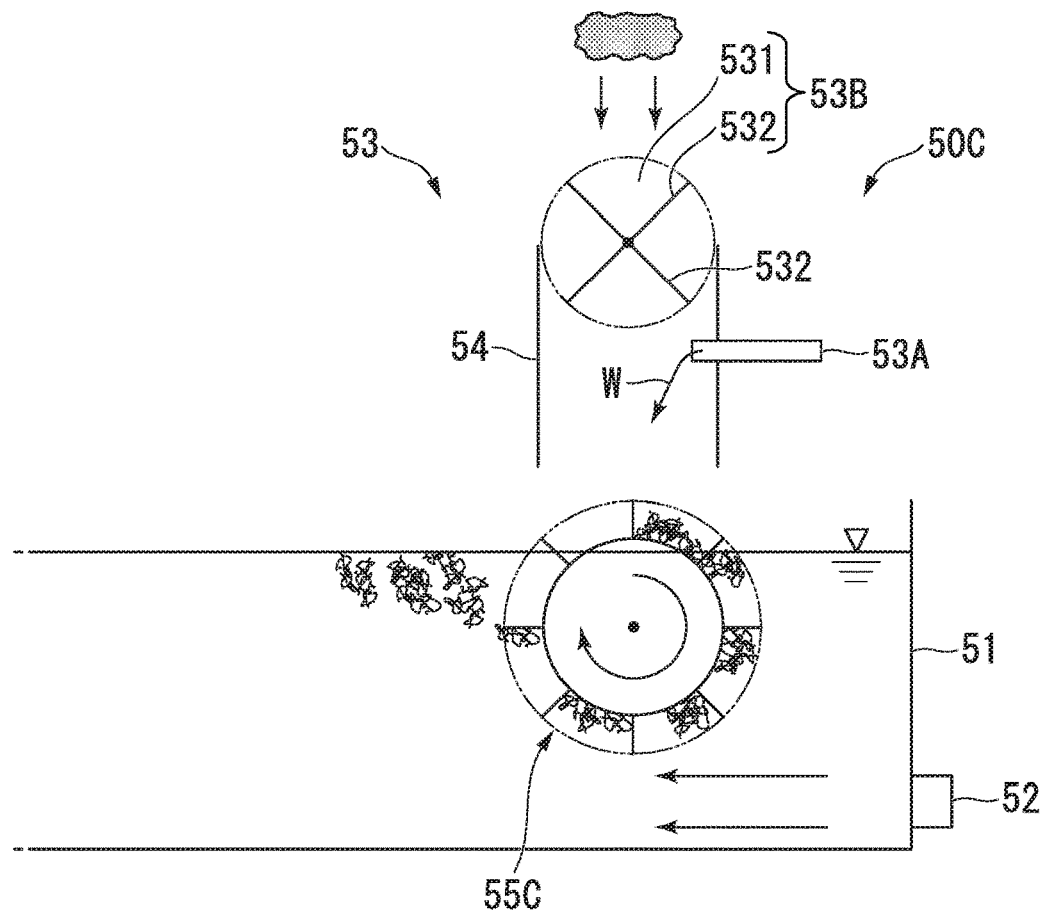
FIG. 8 is a view showing a configuration of a water washing section according to a third embodiment.

Next, a third embodiment will be described with reference to FIG. 8. In addition, the same reference numerals will be given to the same configurations as those in each of the above-described embodiments, and the detailed description thereof will be omitted. In the embodiment, the configuration of a water washing section 50C is different from that of the above-described first embodiment. As shown in FIG. 8, the water washing section 50C according to the embodiment includes the pool 51, the water flow generation section 52, the input section 53, and a waterwheel section 55C.

Water is stored in the pool 51. The water flow generation section 52 causes the water in the pool 51 to flow from one side to the other side in the substantially horizontal direction. The input section 53 is provided above the water surface of the pool 51. Through the input section 53, the carbide is input into the pool 51 together with water W. The input section 53 includes the water injection section 53A, a rotary valve 53B (valve section), and the input cylinder 54. The water injection section 53A has a tubular shape extending from the side wall of the input cylinder 54 into the input cylinder 54, and supplies the water supplied from the outside into the input cylinder 54. The rotary valve 53B is disposed in the input cylinder 54 above the water injection section 53A, and suppresses a backward flow of the air to the upstream side, that is, the carbonization section 40 side. The rotary valve 53B includes a disk portion 531 and a blade portion 532. The disk portion 531 has a shape of a disk around the rotation shaft extending in the substantially horizontal direction. The disk portion 531 is rotatable around the rotation shaft. A plurality of blade portions 532 disposed at intervals in the circumferential direction of the rotation shaft are provided on the surface of at least one side of the disk portion 531. The blade portion 532 has a shape of a plate extending from an inner side in the radial direction of the rotation shaft toward the outside. The input section 53 is supported above the water surface of the pool 51 by the input cylinder 54.

The waterwheel section 55C is provided below the input cylinder 54, that is, under the water surface of the pool 51. The waterwheel section 55C is a waterwheel that rotates around the rotation shaft extending in the substantially horizontal direction. At least the upper part of the waterwheel section 55C is exposed on the water surface. The waterwheel section 55C rotates in a direction in which the upper portion exposed on the water surface moves from the other side to one side in the horizontal direction.

In the above-described water washing section 50C, the carbide is first input together with the water from the input section 53. At this time, by rotating the rotary valve 53B, the carbide is input. The carbide falls together with the water W in the input cylinder 54 and reaches the waterwheel section 55C. As the waterwheel section 55C rotates, the carbide is guided in the direction of sinking into the water and washed with water. The carbide that has reached the other side of the waterwheel section 55C floats up due to its own buoyancy.

According to the above-described configuration, by inputting the carbide into the pool 51 (in water), it is possible to cool the carbide and remove the impurities, such as potassium, sodium, and chlorine, at the same time. Furthermore, according to the above-described configuration, since the carbide is input into the pool 51 together with the water by the input section 53 and the water in the pool 51 flows from one side to the other side by the water flow generation section 52, it is possible to stably wash the carbide with water together with transport by the waterwheel section 55C, and to transport the carbide. In addition, since the carbide is input into the input cylinder 54 as the rotary valve 53B rotates, it is possible to reduce the possibility that the input cylinder 54 is blocked by the carbide. In addition, there is a case where the pressure on the upstream side of the input section 53 is a negative pressure, but by providing the rotary valve 53B, it is possible to reduce the possibility that the input carbide flows back to other equipment (carbonization section 40 or the like).

Figure 9:
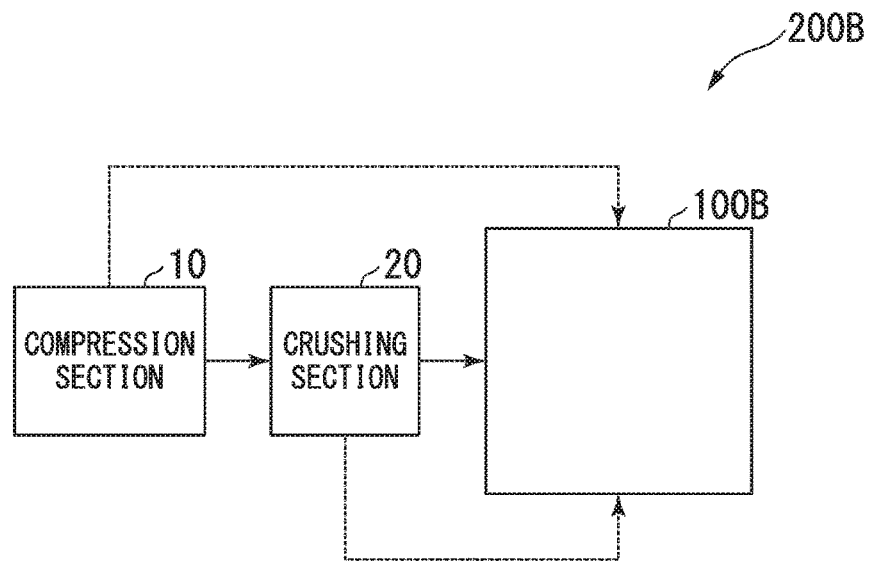
FIG. 9 is a schematic view showing a configuration of a biomass fuel manufacturing plant system according to a fourth embodiment.

Next, a fourth embodiment of the invention will be described with reference to FIG. 9. In addition, the same reference numerals will be given to the same configurations as those in each of the above-described embodiments, and the detailed description thereof will be omitted. As shown in FIG. 9, a biomass fuel manufacturing plant system 200B according to the embodiment includes the compression section 10, the crushing section 20, and a biomass fuel manufacturing plant 100B. In addition, the compression section 10 may be provided in the plantation 90, for example.

The manufacturing plant 100B may be the same as the manufacturing plant 100 according to the first embodiment to the third embodiment, or the solid fuel (biomass fuel) may be manufactured using residual materials generated in the plantation 90 according to another configuration.

According to the above-described configuration, as the discharged oil at compressing generated from the compression section 10 and the discharged oil at crushing generated from the crushing section 20 are supplied to the biomass fuel manufacturing plant 100B, it is possible to utilize the oil as a fuel for the heat treatment or a binder when molding the fuel. Accordingly, in the carbonization section, it becomes possible to increase a supply amount of the heat source in a case where the supply amount of the heat source to the carbonization section is insufficient only with the POME oil.

Above, several embodiments are described with reference to the drawings. In addition, various changes or modifications can be made to the above-described configuration or method without departing from the gist of several embodiments.

For example, the compression section 10 and the crushing section 20 may be installed in the same plant. In addition, in a case where there are a plurality of plantations 90, the crushing may be performed by the crushing section 20 after collecting the EFB at one location from the compression section 10 provided in the palm oil plant 102 of each plantation 90. Furthermore, the compression section 10 and the crushing section 20 may be provided in the biomass fuel manufacturing plant 100, and may construct a small-scale biomass fuel manufacturing plant system.

Furthermore, a dewatering section may be provided between the kneading section 61 and the water washing section 50. In a case where the carbide generated in the carbonization section 40 contains a large amount of water content, by performing dewatering from the carbide with the dewatering section, it is possible to easily perform the kneading. In the dewatering section, the exhaust gas from the drying section 30 may be used. In addition, the heat of the exhaust gas from the drying section 30 may also be used in the kneading section 61. Accordingly, it becomes possible to improve the efficiency of the entire system.

Furthermore, when recovering the compressed empty fruit bunches and the discharged oil from each plantation 90, the amount of the empty fruit bunches and the discharged oil at each plantation 90 may be managed on a network, and the empty fruit bunches and the discharged oil may be efficiently recovered.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 . . . compression section
10A . . . compactor
11 . . . compression chamber
12 . . . piston
13 . . . hydraulic cylinder
14 . . . hydraulic unit
15 . . . mesh
16 . . . container
20 . . . crushing section
30 . . . drying section
31 . . . storage section
32 . . . cover section
33 . . . discharge port
40 . . . carbonization section
50, 50B, 50C . . . water washing section
51 . . . pool
52 . . . water flow generation section
53 . . . input section
53A . . . water injection section
53B . . . rotary valve (valve portion)
531 . . . disk portion
532 . . . blade portion
54 . . . input cylinder
55 . . . input cylinder tube main body
55B . . . transport section
551 . . . first transport section
552 . . . second transport section
5511 . . . roller
5512 . . . belt
5513 . . . plate portion
55C . . . waterwheel section
56 . . . discharge cylinder
56B . . . water detection section
57 . . . connection section
57B . . . water amount control section
58 . . . float portion
60 . . . fuel generation section
61 . . . kneading section
62 . . . molding section
62A . . . pelletizer
621 . . . compression roller
622 . . . die (porous plate)
623 . . . cutter
625 . . . hole
80 . . . separating section
90 . . . plantation
100, 100B . . . manufacturing plant
101, 102 . . . palm oil plant
200, 200B . . . manufacturing plant system
F . . . discharged oil recovery section
L . . . discharged oil supply line
S1 . . . compression step
S2 . . . recovery step
S3 . . . crushing step
S4 . . . drying step
S5 . . . carbonization step
S6 . . . water washing step
S7 . . . fuel generation step
S71 . . . kneading step
S72 . . . molding step
S8 . . . separating step
S9 . . . discharged oil supplying step
EFB . . . empty fruit bunches
POME . . . oil-containing wastewater

What is claimed is:

1. A biomass fuel manufacturing plant comprising:
a separating section that is configured to separate oil and water from oil-containing wastewater discharged from an essential oil plant that is configured to refine essential oil from fruits containing fats and oils, the separating section also being configured to separate the oil and water into POME oil and treated water; and
a discharged oil supply line that is configured to supply at least one of the POME oil, oil discharged by compressing empty fruit bunches, and oil discharged by crushing the empty fruit bunches, to at least one or more locations of
a carbonization section that is configured to generate carbide by performing heat treatment with respect to the empty fruit bunches discharged from the essential oil plant, and
a fuel generation section that is configured to generate a fuel from the carbide.

2. The biomass fuel manufacturing plant according to claim 1,
wherein at least one of the POME oil, the oil discharged by compressing the empty fruit bunches, and the oil discharged by crushing the empty fruit bunches is supplied as fuel for the carbonization section.

3. The biomass fuel manufacturing plant according to claim 1,
wherein the fuel generation section further includes a kneading section for mixing a binder with the carbide, and
wherein the discharged oil supply line is connected to at least one or more locations of the carbonization section and the kneading section.

4. The biomass fuel manufacturing plant according to claim 3,
wherein at least one of the POME oil, the oil discharged by compressing the empty fruit bunches, and the oil discharged by crushing the empty fruit bunches is supplied to the kneading section as the binder.

5. The biomass fuel manufacturing plant according to claim 1, further comprising:
a water washing section that is configured to remove impurities contained in the carbide by washing the carbide with water,
wherein the fuel generation section is configured to generate the fuel from the carbide washed with water by the water washing section.

6. The biomass fuel manufacturing plant according to claim 5,
wherein the water washing section includes a pool for storing water therein, a water flow generation section that is configured to cause the water in the pool to flow from one side to the other side, and an input section that is configured to input the carbide together with the water from above a water surface of the pool,
wherein the input section includes an input cylinder extending to a lower side of the water surface, and a water injection section that has a tubular shape extending from a side wall of the input cylinder into the input cylinder and that is configured to supply the water supplied from an outside into the input cylinder,
wherein the input cylinder includes an input cylinder main body, a discharge cylinder positioned below the input cylinder main body, and a connection section for connecting the input cylinder main body and the discharge cylinder in an up-down direction,
wherein a float portion for floating the discharge cylinder on the water surface is provided in an end portion below the discharge cylinder, and
wherein the connection section is deformable following a change in a height position of the discharge cylinder on the water surface.

7. The biomass fuel manufacturing plant according to claim 5,
wherein the water washing section includes a pool for storing water therein, a water amount control section that is configured to adjust an amount of water stored in the pool, a water flow generation section that is configured to cause the water in the pool to flow from one side to the other side, an input section that is configured to input the carbide together with the water from above a water surface of the pool, a transport section that is provided below the input section and that is configured to transport the carbide from one side to the other side, and a water surface detection section that detects a height of the water surface,
wherein the input section includes an input cylinder extending to a lower side of the water surface, and a water injection section that has a tubular shape extending from a side wall of the input cylinder into the input cylinder and that is configured to supply the water supplied from an outside into the input cylinder, and
wherein the water amount control section adjusts the amount of the water based on a detected value of the water surface detection section such that at least the end portion on one side in the transport section is exposed above the water surface.

8. The biomass fuel manufacturing plant according to claim 5,
wherein the water washing section includes a pool for storing water therein, a water flow generation section that is configured to cause the water in the pool to flow from one side to the other side, an input section that is configured to input the carbide together with the water from above a water surface of the pool, and a waterwheel section that is provided below the input section, has at least a lower portion below the water surface and that is configured to transport the carbide from one side to the other side,
wherein the input section includes an input cylinder disposed above the water surface, a water injection section that has a tubular shape extending from a side wall of the input cylinder into the input cylinder and that is configured to supply the water supplied from an outside into the input cylinder, and a valve portion that is provided above the water injection portion and suppresses a backward flow of the air toward the carbonization section side, and
wherein the valve portion includes a disk portion that is formed in a disk shape around a rotation shaft extending in a horizontal direction and is rotatable around the rotation shaft, and a plurality of blade portions that are disposed at intervals in a circumferential direction of the rotation shaft above a surface at least on one side of the disk portion and extend from an inner side in a radial direction of the rotation shaft toward the outside.

9. The biomass fuel manufacturing plant according to claim 4,
wherein the fuel generation section includes a molding section that is configured to mold a mixture of the carbide and the binder into a predetermined shape.

10. A biomass fuel manufacturing plant comprising:
a separating section that is configured to separate oil and water from oil-containing wastewater discharged from an essential oil plant that is configured to refine essential oil from fruits containing fats and oils, the separating section also being configured to separate the oil and water into POME oil and treated water;
a carbonization section that is configured to generate a carbide by performing heat treatment with respect to empty fruit bunches discharged from the essential oil plant;
a water washing section that is configured to remove impurities contained in the carbide by washing the carbide with water;
a fuel generation section that is configured to generate a fuel from the carbide washed with the water by the water washing section; and
a discharged oil supply line that is configured to supply at least one of the POME oil, oil discharged by compressing empty fruit bunches, and oil discharged by crushing the empty fruit bunches, to at least one or more locations of the carbonization section and the fuel generation section.

11. A biomass fuel manufacturing plant system comprising:
   the biomass fuel manufacturing plant according to claim 1;
   a compression section that is configured to compress the empty fruit bunches;
   a crushing section that crushes the compressed empty fruit bunches; and
   a discharged oil supply section that is configured to supply at least one of the POME oil generated in the separating section, the oil discharged by compressing the empty fruit bunches in the compression section, and the oil discharged by crushing the empty fruit bunches in the crushing section to at least one location of the carbonization section and the fuel generation section through the discharged oil supply line,
   wherein the biomass fuel manufacturing plant further includes a drying section that is configured to dry the crushed empty fruit bunches.

12. A biomass fuel manufacturing plant system comprising:
   the biomass fuel manufacturing plant according to claim 10;
   a compression section that is configured to compress the empty fruit bunches;
   a crushing section that crushes the compressed empty fruit bunches; and
   a discharged oil supply section communicating with the discharged oil supply line that is configured to supply at least one of the POME oil generated when separating oil and water from the oil-containing wastewater discharged from the essential oil plant, the oil discharged by compressing the empty fruit bunches in the compression section, and the oil discharged by crushing the empty fruit bunches in the crushing section to at least one location of the carbonization section and the fuel generation section,
   wherein the biomass fuel manufacturing plant further includes a drying section that is configured to dry the crushed empty fruit bunches.

13. The biomass fuel manufacturing plant system according to claim 11,
   wherein the discharged oil supply section is configured to supply the POME oil as at least fuel for the heat treatment to the carbonization section.

14. The biomass fuel manufacturing plant system according to claim 11,
   wherein the drying section includes a storage section for storing the crushed empty fruit bunches therein and discharging water content contained in the empty fruit bunches by a weight of the empty fruit bunches.

15. The biomass fuel manufacturing plant system according to claim 14,
   wherein the storage section includes a cover section that covers the stored empty fruit bunches from above and is formed of a material having light transmitting properties through which sunlight is transmitted.

16. The biomass fuel manufacturing plant system according to claim 11,
   wherein the compression section is one of a plurality of compression sections,
   wherein a plurality of plantations have the compression sections, respectively, and the compressed empty fruit bunches are recovered and sent to the crushing section from the plurality of plantations.

17. A biomass fuel manufacturing method comprising:
   separating oil and water from oil-containing wastewater discharged from an essential oil plant that is configured to refine essential oil from fruits containing fats and oils, and separating the oil and water into POME oil and treated water; and
   supplying at least one of the POME oil, oil discharged by compressing empty fruit bunches, and oil discharged by crushing the empty fruit bunches, to at least one or more locations of a carbonization section for generating carbide by performing heat treatment with respect to the empty fruit bunches discharged from the essential oil plant and a fuel generation section for generating a fuel from the carbide,
   wherein, in the supplying of the at least one of the oils, at least one of the POME oil, the oil discharged by compressing the empty fruit bunches, and the oil discharged by crushing the empty fruit bunches is supplied to at least one location in the carbonization section and the fuel generation section.

18. The biomass fuel manufacturing method according to claim 17,
   wherein at least one of the POME oil, the oil discharged by compressing the empty fruit bunches, and the oil discharged by crushing the empty fruit bunches is supplied as fuel for the generating of the carbide.

19. The biomass fuel manufacturing method according to claim 17,
   wherein the generating of the fuel from the carbide includes mixing a binder with the carbide, and
   wherein in the supplying of the at least one of the oils, at least one of the POME oil, the oil discharged by compressing the empty fruit bunches, and the oil discharged by crushing the empty fruit bunches is supplied to the carbonization section for the mixing of the binder with the carbide.

20. The biomass fuel manufacturing method according to claim 19,
   wherein at least one of the POME oil, the oil discharged by compressing the empty fruit bunches, and the oil discharged by crushing the empty fruit bunches is supplied as the binder in the mixing of the binder with the carbide.

21. The biomass fuel manufacturing method according to claim 17, further comprising:
   removing impurities contained in the carbide by washing the carbide with water,
   wherein in the generating of the fuel from the carbide, the fuel is generated from the washed carbide.

22. The biomass fuel manufacturing method according to claim 20,
   wherein the generating of the fuel includes molding a mixture of the carbide and the binder into a predetermined shape.

23. The biomass fuel manufacturing method according to claim 17, further comprising:
   compressing the empty fruit bunches during the generating of the carbide;
   crushing the compressed empty fruit bunches; and
   drying the crushed empty fruit bunches.

24. The biomass fuel manufacturing method according to claim 23,
   wherein the compressing of the empty fruit bunches is performed at a plurality of locations, and wherein the method further comprises recovering the compressed empty fruit bunches between the compressing of the empty fruit bunches and the crushing of the empty fruit bunches.

25. A biomass fuel manufacturing method comprising:

generating a carbide by performing heat treatment with respect to empty fruit bunches discharged from an essential oil plant by using separated oil discharged from the essential oil plant that is configured to refine essential oil from fruits containing fats and oils as a fuel;

removing impurities contained in the carbide by washing the carbide with water; and generating the fuel from the carbide washed with the water.

26. A biomass fuel comprising:

carbides of empty fruit bunches obtained from fruits containing fats and oils; and a binder for adhering the carbides to each other, wherein the binder includes at least one of POME oil obtained by separating oil and water from oil-containing wastewater discharged when generating essential oil from fruits, oil discharged by compressing the empty fruit bunches, or oil discharged by crushing the empty fruit bunches.

* * * * *